Sept. 1, 1970  T. O. PAINE, DEPUTY  3,526,359
ADMINISTRATOR OF THE NATIONAL AERONAUTICS
AND SPACE ADMINISTRATION
MOUNT FOR THERMAL CONTROL SYSTEM
Filed Sept. 12, 1968
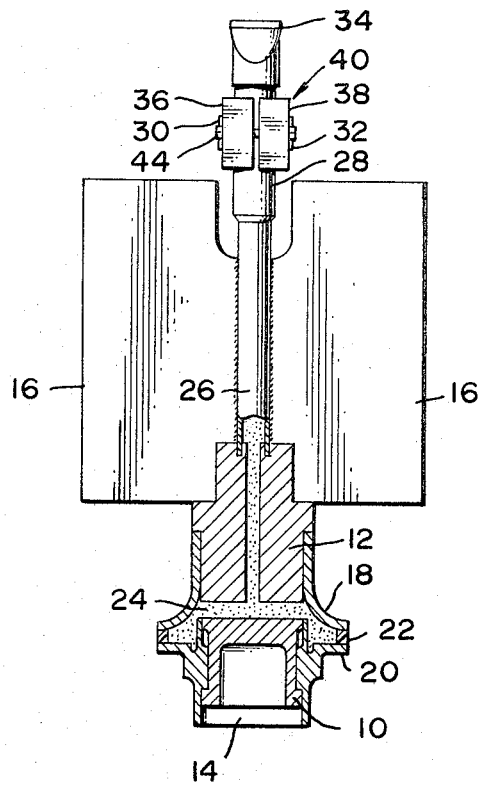
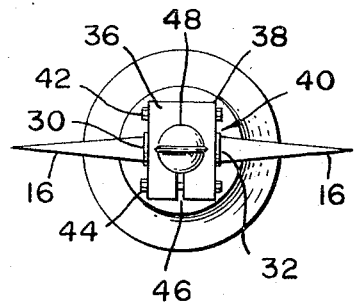
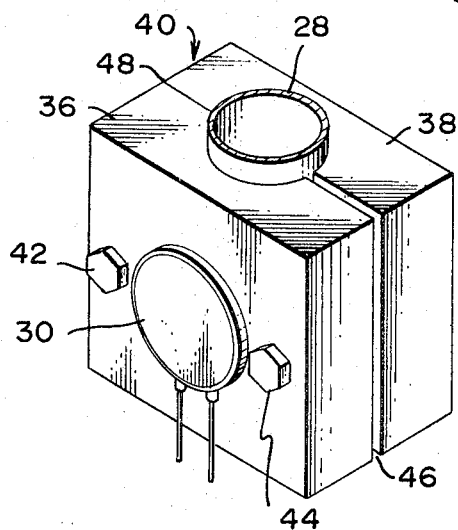
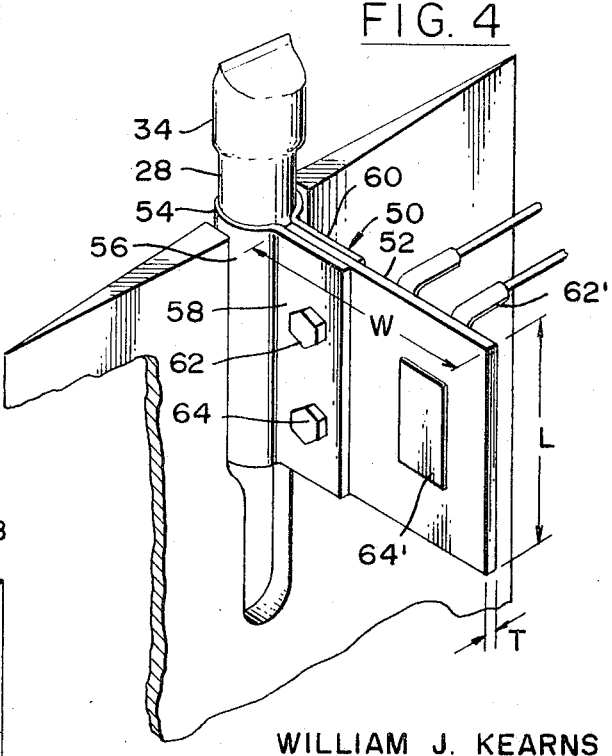
WILLIAM J. KEARNS
*INVENTOR.*
BY
ATTORNEYS

United States Patent Office

3,526,359
Patented Sept. 1, 1970

---

3,526,359
MOUNT FOR THERMAL CONTROL SYSTEM
T. O. Paine, Deputy Administrator of the National Aeronautics and Space Administration, in respect to an invention of William J. Kearns, Arcadia, Calif.
Filed Sept. 12, 1968, Ser. No. 759,457
Int. Cl. H05b 1/00
U.S. Cl. 236—1                                    5 Claims

ABSTRACT OF THE DISCLOSURE

Apparatus for controlling the temperature of a component, comprising a mounting block of high thermal conductivity clamped to the component, a heating element mounted on one side of the block to heat it, and a temperature sensing element mounted on the other side of the block to measure the mounting block temperature.

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

Field of the invention

This invention relates to apparatus for controlling the temperature of a component.

Description of the prior art

Many systems include small components which must be maintained at predetermined high temperatures. This is often accomplished with a temperature control unit employing a temperature sensing element and a heating element. A circuit controlled by the sensing element governs the amount of current applied to the heating element, to maintain the component at close to the preselected temperature. Such units have generally been installed using two separate mountings, one for the sensing element and one for the heating element, to thermally separate them. This is to make sure that the sensing element measures the temperature of the system component whose temperature is to be controlled, rather than the higher temperature of the heating element. The use of two separate mountings, however, often complicates the installation of the control unit.

A typical system requiring such temperature control of a component is a current generator for use on a space craft, which utilizes a thermionic diode. The thermionic diode may employ cesium vapor in the space between the cathode and anode, to aid in the flow of electrons therebetween. The cesium is maintained at a particular pressure such as one torr by maintaining the temperature of a small cesium reservoir at a level such as 325° centigrade. This is accomplished by a temperature control system using heater and temperature sensing elements held in contact with the reservoir. The temperature control unit is generally tested apart from the thermionic diode, and is designed to be used on various diodes. This feature results in repeated mounting and removal of the heater and sensing elements therefrom. A means for enabling a single mount to be used for both elements would facilitate mounting and decrease the possibility of faulty mounting.

OBJECTS AND SUMMARY OF THE INVENTION

One object of the invention is to provide means for facilitating the mounting of a temperature control system.

Another object is to provide an improved mount for heating and temperature sensing elements.

In accordance with the present invention, simple mounting apparatus is provided for holding the heating and temperature sensing elements of a temperature control system in thermal contact with a component. The apparatus comprises a mounting block constructed of a material, such as copper, that has high thermal conductivity. Both the heating and temperature sensing elements are mounted on the block but at opposite sides thereof. The block is of sufficient thickness to assure that the portion against the temperature sensing element has a temperature very close to the temperature of the component.

In one embodiment of the invention, the component is of cylindrical outside shape, and the mounting block comprises a pair of plates which can be held with the component between them. The plates have depressions for receiving the component, to provide a large contact area for heat transfer. The sides of the plates extend past the component, and bolts extending through holes in these sides draw the plates towards each other.

In another embodiment of the invention, the mounting block comprises a plate with one end attached to a clamp that is mounted on the component. The heating and sensing elements are mounted on opposite faces of the plate. The block is thick enough so that the temperature at the sensing element is close to that of the component. Removal of both the heating and sensing elements is accomplished by removing the plate from the clamp.

The novel features of the invention are set forth with particularity in the appended claims. The invention will best be understood from the following description when read in conjunction with the accompanying drawings.

BRIEF DESCRIPTION OF THE DRAWINGS

FIG. 1 is a sectional side elevation view of a thermionic diode utilizing the mount apparatus of the present invention;

FIG. 2 is a plan view of the apparatus of FIG. 1;

FIG. 3 is a partial isometric view of the apparatus of FIG. 1, showing the mounting apparatus thereof; and FIG. 4 is an isometric view of mounting apparatus constructed in accordance with another embodiment of the invention.

DESCRIPTION OF THE PREFERRED EMBODIMENTS

FIG. 1 illustrates a thermionic diode for converting heat energy to electrical energy, comprising an emitter 10 and collector 12. The emitter 10 is heated by focusing radiation from the sun to the side 14, and the collector is cooled by fins 16. This difference in temperature causes an electrical potential to be developed between the emitter and collector, and current can then be drawn from them through electrical leads (not shown). The emitter and collector are held apart by mounting members 18 and 20 and an insulator ring 22. The space 24 between the emitter and collector is filled with cesium vapor.

The presence of cesium vapor at a proper pressure is necessary in the space 24 between the emitter and collector for efficient operation of the diode. In a typical diode, the emitter may have a temperature of 1800° centigrade and the collector a temperature of 700° centigrade. The pressure of cesium must be maintained at a fraction of 1 atmosphere, with a tolerance of less than several percent. This is accomplished by coupling the space 24 through a tube 26 to a reservoir 28 containing liquid cesium, and maintaining the reservoir at a temperature such as 325° centigrade with a tolerance of ±5° C.

The reservoir 28 is located on the side of the fins 16 opposite the collector 12, so that the reservoir is at an area which is somewhat less than 325° centigrade, the desired reservoir temperature. Thus, proper reservoir temperature is maintained by always adding a small amount of heat to the reservoir. Temperature control is accomplished by a control system comprising a heater element 30 and temperature sensing element 32 which are thermally coupled to the reservoir.

The reservoir 28 comprises a length of thin-wall tube with its end 34 pinched and welded closed. The heater and sensing elements 30 and 32 are mounted on two portions 36 and 38 of a mounting block assembly 40, shown in greater detail in FIG. 3. The portions 36 and 38 of the mounting block assembly are plates of a material such as copper which is of high thermal conductivity. Each of the plates has a half-cylindrical depression in one face for receiving one-half of the reservoir tube 28, to assure good thermal contact with it. The two plate portions 36 and 38 are disposed on opposite sides of the reservoir and are fastened together by a pair of bolts 42 and 44. The plate portions have sides which extend past the reservoir, and the bolts project through holes in the sides. The tube portions 36 and 38 are formed so that, when the bolts are tightened, a small separation shown at 46 exists at one side of the portions. This assures that the two portions are in good thermal contact with the reservoir tubing.

While the two portions 36 and 38 are in thermal contact with each other, particularly at the side 48 where they touch, they are in much better contact with the reservoir 28. Accordingly, the temperature of the portion 38 cannot be appreciably different from the temperature of the reservoir tube 28, even if the heater element 30 is supplying substantial heat. Thus, the sensing element 32 can be relied upon to provide an accurate indication of the temperature of the reservoir.

Removal of the heater and sensor elements 30 and 32 is accomplished by merely loosening the bolts 42 and 44, and reassembly is accomplished in a similar simple manner. The limited number of parts, and their ruggedness enables repeated disassembly of the apparatus in a simple manner and without the likelihood of damage. Yet, the elements are assured of good thermal contact with the reservoir and the sensing element 32 is assured of being at a temperature close to that of the reservoir. The mounting block assembly 40 adds only a relatively small weight to the diode because such diodes are generally very small, the reservoir 28 having a diameter typically on the order of ⅛ inch.

FIG. 4 illustrates another embodiment of the invention wherein the mounting block assembly 50 comprises a plate 52 and a clamp 54 having an angular portion 56 and a pair of flanges 58 and 60. A pair of bolts 62 and 64 project through holes in the flanges and plates to hold them together. A heating element 62' and temperature sensing element 64' are fastened to the plate 52 on opposite faces thereof. The plate 52 and clamp 54 are constructed of a good thermally conductive material such as copper. For the heating of the reservoir tube 28, only a relatively small heat input is required, and it is found that in this case a moderately thick plate 52 is sufficient to assure that the sensing element 64' is always close to the temperature of the reservoir 28.

The removal of the temperature control system is accomplished by loosening the two bolts 62 and 64, thereby enabling the removal of the plate 52. The clamp 54 may be left engaged with the reservoir 28 after the plate 52 is removed. The heating and sensing elements, which are permanently mounted on the plate, can then be tested separately from the diode. The mounting elements are rugged and removal and remounting can be accomplished easily, thereby assuring high reliability. In order to enable secure holding of the clamp 54 to the reservoir tube, the annular portion 56 must extend at least half way, or 180 degrees about the tube and less than 360 degrees. The clamp is constructed so that the flanges 58 and 60 are separated by slightly more than the thickness of the plate when they are not clamped to the plate. However, when the plate is held tightly between the flanges, the annular portion holds tightly to the reservoir 28, thereby preventing dislodgement and assuring good thermal contact.

The embodiment of the invention shown in FIG. 4 has been found to provide an accurate control system even though the thermal path between the heating and sensing elements is considerably shorter than the path between the reservoir and sensing element. A mounting has been constructed with a copper plate having a width W of ½ inch, a length L of ⅜ inch and a thickness T of 1/16 inch, wherein the heating element 62 supplied between one-half and four watts of heating power to maintain a reservoir temperature of approximately 325° centigrade. The sensing element 64' was found to remain at very close to the reservoir temperature, and control of the reservoir temperature to within 5° centrigrade was easily maintained.

Although particular embodiments of the invention have been described and illustrated herein, it is recognized that modifications and variations may readily occur to those skilled in the art, and, consequently, it is intended that the claims be interpreted to cover such modifications and equivalents.

What is claimed is:

1. Apparatus for maintaining a component at close to a predetermined temperature, wherein said component has first and second portions on opposite sides which are of predetermined configuration, comprising:
   mounting block means constructed of a material of high thermal conductivity, said mounting block means including first plate means having a first face portion formed complementary to said first portion of said component for receiving it in thermal contact therewith and a second face portion, and second plate means having a first face portion formed complementary to said second portion of said component for receiving said second portion in thermal contact therewith and a second face portion;
   a heating element coupled to said second face portion of said first plate means to heat it;
   a temperature sensing element coupled to said second face portion of said second plate means to measure its temperature; and
   means for pressing said first and second plate means toward each other with said components lying between then and engaged with said first face portions of said plate means.

2. The apparatus described in claim 1 wherein:
   said first and second plate means have side portions that extend on either side of said component, each of said side portions having a hole; and
   said fastening means comprises bolt means extending through corresponding holes in said side portions to hold said plate means together.

3. Apparatus for maintaining a component at close to a predetermined temperature comprising:
   a plate with first and second faces, constructed of a material of high thermal conductivity;
   a heating element mounted on said first face of said plate;
   a temperature sensing element mounted on said second face of said plate; and
   mounting means including a portion for thermally coupling to said component, a pair of flanges for receiving said plate between them, and means for holding said flanges tightly together to clamp said plate in place.

4. Apparatus for maintaining a tube at close to a preselected temperature comprising:
   first means having a first face with a substantially semi-cylindrical depression therein for receiving said tube and a second face;

second means having a first face with a substantially semi-cylindrical depression therein for receiving said tube and a second face, each of said means having portions which lie on opposite sides of said semi-cylindrical depression, said portions having holes extending therethrough;

a heating element coupled to said second face of said first means;

a temperature sensing element coupled to said second face of said second means; and fastening means extending through said holes in adjacent side portions of said plate means to hold them together.

5. Apparatus for maintaining a component of tubular shape at close to a predetermined temperature comprising:

a member with an angular portion extending more than 180° and less than 360° about said tube and having a pair of closely spaced flanges;

a plate having opposite faces and having an edge portion disposed between said flanges, said flanges and said edge portion of said plate having corresponding holes for receiving bolt means to hold them together;

a heating element mounted on a face of said plate; and a temperature sensing element mounted on a face of said plate.

References Cited

UNITED STATES PATENTS

| | | |
|---|---|---|
| 1,921,432 | 8/1933 | Stallard. |
| 2,524,886 | 10/1950 | Colander _____ 236—1 |
| 2,616,628 | 11/1952 | Guild _____ 236—1 |

FOREIGN PATENTS 3,532,275    7/1931    Great Britain.

EDWARD J. MICHAEL, Primary Examiner

U.S. Cl. X.R.

219—209